(12) United States Patent
Xu et al.

(10) Patent No.: US 10,069,173 B2
(45) Date of Patent: Sep. 4, 2018

(54) RECHARGEABLE NICKEL ION BATTERY BASED ON NANO CARBONMATERIALS

(71) Applicant: Graduate School at Shenzhen, Tsinghua University, Shenzhen, Guangdong (CN)

(72) Inventors: Chengjun Xu, Guangdong (CN); Shan Shi, Guangdong (CN); Yanyi Chen, Guangdong (CN); Feiyu Kang, Guangdong (CN)

(73) Assignee: GRADUATE SCHOOL AT SHENZHEN, TSINGHUA UNIVERSITY, Shenzhen, Guangdong (CN)

( * ) Notice: Subject to any disclaimer, the term of this patent is extended or adjusted under 35 U.S.C. 154(b) by 77 days.

(21) Appl. No.: 15/255,533

(22) Filed: Sep. 2, 2016

(65) Prior Publication Data

US 2016/0372795 A1 Dec. 22, 2016

Related U.S. Application Data

(63) Continuation of application No. PCT/CN2014/072875, filed on Mar. 4, 2014.

(51) Int. Cl.
| | |
|---|---|
| *H01M 10/36* | (2010.01) |
| *H01M 4/66* | (2006.01) |
| *H01M 4/62* | (2006.01) |
| *H01M 4/38* | (2006.01) |
| *H01M 4/583* | (2010.01) |

(52) U.S. Cl.
CPC ............. *H01M 10/36* (2013.01); *H01M 4/38* (2013.01); *H01M 4/583* (2013.01); *H01M 4/625* (2013.01); *H01M 4/661* (2013.01); *H01M 4/623* (2013.01); *H01M 2300/0002* (2013.01)

(58) Field of Classification Search
CPC ......... H01M 10/36; H01M 2300/0002; H01M 4/38; H01M 4/583; H01M 4/623; H01M 4/625; H01M 4/661

See application file for complete search history.

(56) References Cited

FOREIGN PATENT DOCUMENTS

| | | |
|---|---|---|
| CN | 2532569 | 1/2003 |
| CN | 2615840 | 5/2004 |
| CN | 102005615 | 4/2011 |
| CN | 202712363 | 1/2013 |
| CN | 103390509 | 11/2013 |
| JP | 2008186703 | 8/2008 |

OTHER PUBLICATIONS

International Search Report issued in the corresponding International PCT Application No. PCT/CN2014/072875, dated Sep. 28, 2014, 6 pages.

*Primary Examiner* — Carlos Barcena
(74) *Attorney, Agent, or Firm* — Hamre, Schumann, Mueller & Larson, P.C.

(57) ABSTRACT

This invention discloses a rechargeable nickel ion battery based on the nano-carbon materials. The said nickel ion battery is composed of a nano-carbon material cathode, a nickel anode, an separator, and an electrolyte containing nickel ions. The said nano-carbon materials are fullerene, carbon nanotube, graphene, carbon fiber, carbon foam or the composite of over two different carbon materials, etc. During discharging anodic nickel will be electrochemically dissolved as $Ni^{2+}$ ions, which diffuses to the cathodic electrode/electrolyte interface through the electrolyte, and nickel ions are subsequently stored on surface of nano-carbon materials. During charging, above-mentioned process will be reverse. This battery is characterized with high capacity, fast charge and long cycle life due to the high surface area of nano-carbon materials.

5 Claims, 2 Drawing Sheets

US 10,069,173 B2

RECHARGEABLE NICKEL ION BATTERY BASED ON NANO CARBONMATERIALS

BACKGROUND

This invention relates to rechargeable nickel ion batteries with high capacity.

There exist six types of small and portable batteries, including Zn—Mn batteries, NiMH batteries, NiCa batteries, lithium-ion batteries, lead-acid batteries and zinc-ion batteries. Among them, Zn—Mn batteries are primary batteries and cannot charge/discharge repeatedly; the other batteries, as secondary batteries, are rechargeable. Secondary batteries make the most of raw materials, thus are more economical and functional; however, their service life is generally several hundred cycles, which means that the batteries need to be replaced after using period of time.

Previous patent application (CN 201010297235.3) invented a rechargeable nickel ion battery, which uses α-MnO$_2$ as cathode, nickel as anode and nickel ion aqueous solution as the electrolyte. The battery chemistry of nickel ion battery is written as:

cathodic reaction: $x\text{Ni}^{2+}+2xe^-+\text{MnO}_2 \leftrightarrow \text{Ni}_x\text{MnO}_2$ (1); and

anodic reaction: $\text{Ni} \leftrightarrow \text{Ni}^{2+}+2e^-$ (2).

The nickel ion battery is low-cost, safe and environment-friendly, but its MnO$_2$ cathode has a low capacity of 80 mAh g$^{-1}$. As is known to all, high capacity is the necessary prerequisite to the practical application of batteries. Therefore, the enhancement of battery capacity should be achieved by searching for new electrode materials with higher capacity.

Graphene and carbon nanotubes (CNTs) are nano-carbon materials with unique structures. Graphene is constructed by single or multi layers (usually less than 10 layers) of carbon atoms, while CNTs are formed by curled graphite sheets. Unique structures result in special properties of the above materials. Graphene and CNTs, as energy storage materials, have been widely utilized in Li-ion batteries and supercapacitors, showing a very high capacity of 300-1000 mAh g$^{-1}$. This patent reveals a rechargeable nickel ion battery with graphene cathode or CNT cathode. By storing nickel ion, graphene and CNTs can deliver a capacity of 500 mAh g$^{-1}$, which is six times larger than MnO$_2$ cathode capacity, therefore, capacity of nickel ion battery is enhanced.

SUMMARY OF THE INVENTION

The purpose of this patent is to invent a new battery with high capacity.

Graphene and carbon nanotubes (CNTs) are nano-carbon materials with unique structures. Graphene is constructed by single or multi layers (usually less than 10 layers) of carbon atoms, while CNTs are formed by curled graphite sheets. Unique structures result in special properties of the above materials. This application demonstrates that nano-carbon materials, such as graphene and carbon nanotubes, can store and release nickel ions on their surface to obtain a high capacity of 500 mAh g$^{-1}$.

On the basis, the present invention proposes a rechargeable nickel ion battery with nano-carbon material (for example, graphene or CNTs) cathode, nickel anode and nickel ion aqueous solution electrolyte.

Energy storage mechanism of the nickel ion battery with nano-carbon material cathode is as follows:

cathodic reaction: $x\text{Ni}^{2+}+2xe^-+\text{NC} \leftrightarrow \text{Ni}_x\text{NC}$ (3); and

anodic reaction: $\text{Ni} \leftrightarrow \text{Ni}^{2+}+2e^-$ (2), where NC stands for nano carbon material.

The nickel ion battery has a high capacity of over 500 mAh g$^{-1}$.

The rechargeable nickel ion battery comprises a cathode, an anode, a separator for separating said cathode from said anode, and an electrolyte which has good ionic conductivities.

The said anode can be nickel element based active material.

The said cathode material is nano-carbon materials, such as graphene and CNTs.

The said electrolyte comprises a solvent and a solute. The said solvent is water. The said solute is a soluble salt of nickel. The said electrolyte can transport ions. The pH value of the said electrolyte is between 3 and 7.

The said nano-carbon material cathode possesses a thickness of less than 100 nanometers. The said nano-carbon material is for example, fullerene, carbon nanotube, graphene, carbon fiber or the composite of over two different carbon materials, etc.

The said anode is is in any shapes of pure nickel or nickel alloys.

The said anode composes a compressed mixture of pure nickel and/or nickel alloy particles, electrically conductive particles and a binder.

The said cathode material contains conductive agents. Weight fraction of the said conductive agents is less than 50% in cathode.

The said anode material contains conductive agents. Weight fraction of the said conductive agents is less than 50% in anode.

The said soluble salt of nickel can be nickel nitrate, nickel sulfate and/or nickel chloride.

DETAILED DESCRIPTION OF THE PREFERRED EMBODIMENTS

Figure 1:
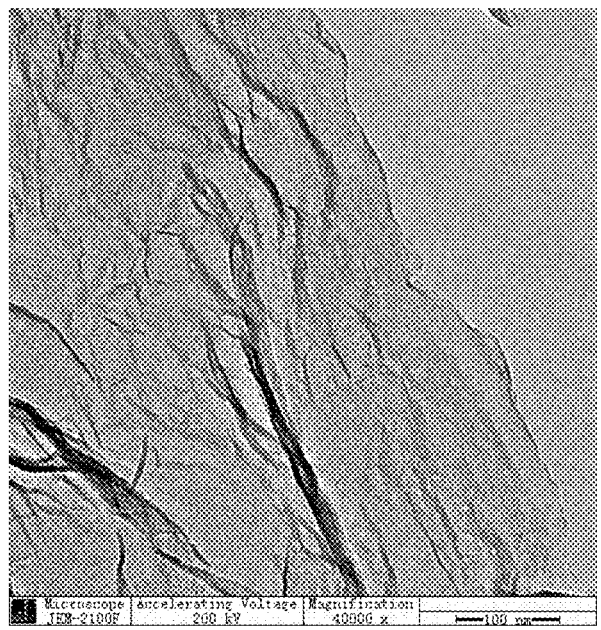
FIG. 1 The transmission electron microscope (TEM) image of graphene.
Figure 2:
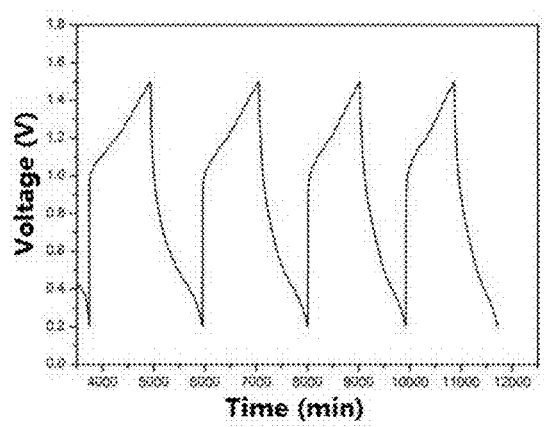
FIG. 2 The discharge and charge curves of Cell 1 at a current density of 100 mA g$^{-1}$.

Graphene can be synthesized by various ways. TEM image of graphene is shown in FIG. 1. Graphene electrodes were prepared by mixing 80 wt % of graphene powder as active material with 10 wt % acetylene black and 10 wt % polytetrafluoroethylene (PTFE) and coating on stainless steel foil, followed by drying in a vacuum. The battery test used the coin cell assembly consisting of graphene electrode as cathode, nickel foam (0.1 mm in thickness) as anode and 1 mol L$^{-1}$ NiSO$_4$ aqueous solution as electrolyte. This cell was denoted as Cell 1. Its charge/discharge curves at 100 mA g$^{-1}$ are displayed in FIG. 2. It can be seen that Cell 1 is secondary battery because it can be charged/discharged repeatedly. Capacity of Cell 1 is 1687 mAh g$^{-1}$ if calculated based on the weight of active materials in cathode.

Figure 3:
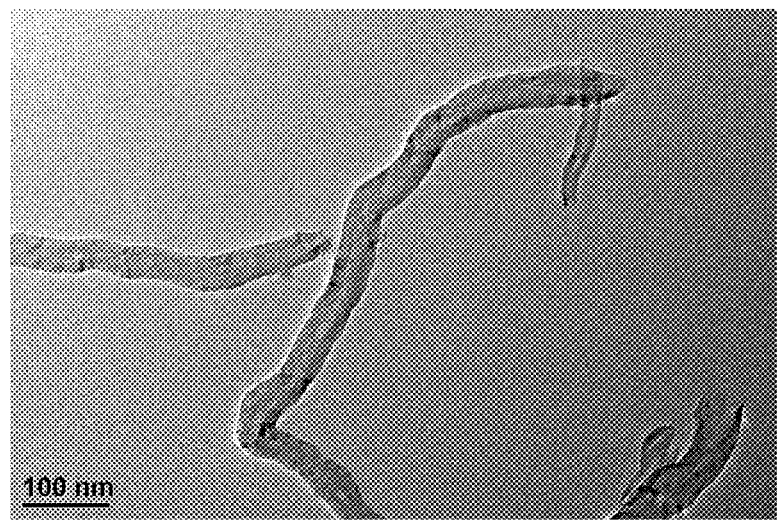
FIG. 3 The TEM image of CNTs.
Figure 4:
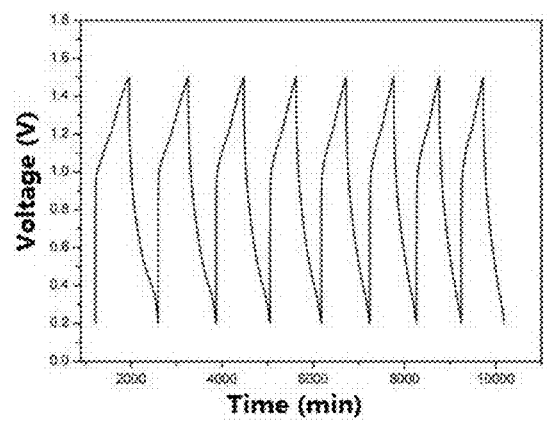
FIG. 4 The charge and discharge curves of Cell 2.

TEM image of CNTs is given in FIG. 3. Herein, the used CNTs are multi-walled CNTs. Carbon nanotube electrodes were prepared by mixing 80 wt % of graphene powder as active material with 10 wt % acetylene black and 10 wt % polytetrafluoroethylene (PTFE) and coating on stainless steel foil, followed by drying in a vacuum. The battery test used the coin cell assembly consisting of carbon nanotube electrode as cathode, nickel foam (0.1 mm in thickness) as anode and 1 mol L$^{-1}$ NiSO$_4$ aqueous solution as electrolyte. This cell was denoted as Cell 2. Its charge/discharge curves at 100 mA g$^{-1}$ are displayed in FIG. 4. It can be seen that Cell 2 is secondary battery because it can be charged/discharged repeatedly. Capacity of Cell 1 is 789 mAh g$^{-1}$ if calculated based on the weight of active materials in cathode.

What is claimed is:

1. A rechargeable nickel ion battery comprising:
   a cathode including a nano-carbon material, on which nickel ions can be stored;
   an anode containing nickel;
   a separator to separate said cathode from said anode; and
   an electrolyte containing nickel ions.

2. The rechargeable nickel ion battery as in claim 1, wherein said nano-carbon material has a thickness of less than 100 nanometers; and said nano-carbon material is fullerene, carbon nanotube, graphene, carbon fiber, or a composite thereof.

3. The rechargeable nickel ion battery as in claim 1, wherein said anode is pure nickel foam or nickel alloy foam.

4. The rechargeable nickel ion battery as in claim 1, wherein said anode comprises a compressed mixture of pure nickel and/or nickel alloy particles, electrically conductive particles, and a binder.

5. The rechargeable nickel ion battery as in claim 4, wherein said binder is at least one selected from the group consisting of natural rubber, synthetic rubber, polysulfone, acrylic polymer, epoxy resin, polystyrene, and polytetrafluoroethylene.

* * * * *